US009569944B2

(12) United States Patent
Barnes et al.

(10) Patent No.: US 9,569,944 B2
(45) Date of Patent: Feb. 14, 2017

(54) METHOD AND SYSTEM FOR STATE-BASED POWER MANAGEMENT OF ASSET TRACKING SYSTEMS FOR NON-STATUTORY ASSETS

(71) Applicant: Trapeze Software ULC, Mississauga (CA)

(72) Inventors: Sharon Ann Irma Barnes, Kelowna (CA); Marty Charles Brooks, Kelowna (CA)

(73) Assignee: Trapeze Software ULC, Mississauga (CA)

( * ) Notice: Subject to any disclaimer, the term of this patent is extended or adjusted under 35 U.S.C. 154(b) by 76 days.

(21) Appl. No.: 14/580,506

(22) Filed: Dec. 23, 2014

(65) Prior Publication Data

US 2016/0180675 A1    Jun. 23, 2016

(51) Int. Cl.
*G08B 13/24*    (2006.01)

(52) U.S. Cl.
CPC ....... *G08B 13/2468* (2013.01); *G08B 13/2428* (2013.01)

(58) Field of Classification Search
CPC .................. G08B 13/2468; G06Q 10/0833
USPC .................. 340/572.4, 572.1, 8.1, 10.5
See application file for complete search history.

(56) References Cited

U.S. PATENT DOCUMENTS

| | | | |
|---|---|---|---|
| 2011/0133888 A1* | 6/2011 | Stevens | G06Q 10/0833 340/8.1 |
| 2015/0154427 A1* | 6/2015 | Barnes | G06Q 10/0833 340/10.5 |

* cited by examiner

*Primary Examiner* — Toan N Pham
(74) *Attorney, Agent, or Firm* — Elan IP Inc.

(57) ABSTRACT

A method and system for power consumption management for moveable assets is provided. Various states and modes are defined, in which elements of the system may operate, each state and mode having different power requirements based on different operational requirements and communication paradigms. Various triggers may indicate which state and mode to be in, with the lowest power consumption operating status being selected whenever possible based on the triggers.

10 Claims, 5 Drawing Sheets

| Current State | Trigger | New/Future State |
|---|---|---|
| Stationary | Motion = True | In-Motion |
| | Other | Other |
| Stopped | Motion = True | In-Motion |
| | Immobile = True | Stationary |
| In-Motion | Motion = False | Stopped |
| | Other | Other |
| Any | On-Site = False | State remains the same; Communication Mode = Offsite |
| | On-Site = True | State remains the same; Communication Mode = Onsite |

| Current Communication Mode | Trigger | New/Future Communication Mode |
|---|---|---|
| Offsite | On-Site = True | Onsite |
| Onsite | On-Site = False | Offsite |

FIG. 5

METHOD AND SYSTEM FOR STATE-BASED POWER MANAGEMENT OF ASSET TRACKING SYSTEMS FOR NON-STATUTORY ASSETS

FIELD OF THE INVENTION

The present invention relates generally to radio frequency identification power management. More particularly, the present invention relates to a method and system for managing power for the use of radio frequency identification on assets using a plurality of states and modes.

BACKGROUND OF THE INVENTION

The use of radio frequency identification (RFID) tags to assist with Asset management is known. Placing RFID tags on assets allows for constant tracking of an asset's location and status. But these systems often have issues regarding power consumption, as transmitting information can be quite power intensive for the RFID tag. This issue becomes even more severe when the asset management system is being used in an environment where the assets themselves might constantly be moving, both within the owner's property and outside of it.

One example arises in the transit field. Transit officials may use asset management systems with RFID tags to track their vehicles. But there are many situations when the RFID tags may not need to communicate, for example, when the transit vehicle is away from the transit yard as they are likely out of range of a gateway that can receive transmission. Communications may also be limited when vehicles are stationary in the transit yard, for example overnight when transit operations are not occurring. The RFID tag can expend a lot of power transmitting signals when the asset's location and status are not changing. The RFID tag may also not communicate when it is moving, as movement may be detrimental to the reliability of the communication link between a gateway and the RFID tag. It may be desirable, in some of these scenarios, to reduce the frequency of transmissions and/or reception.

It is therefore an object of the invention to provide a novel method and system for state-based power management of asset tracking systems for non-stationary assets.

SUMMARY OF THE INVENTION

There is a system for radio frequency identification (RFID) tag on an asset within an asset management system, the asset management system comprising one or more assets, one or more gateways and one or more other assets at a site that tags can communicate with, and assets in the asset management system either being on-site or off-site, the RFID tag operable in one of several state-modes, each state-mode having a different power consumption level and comprising one state of one or more states and one mode of one or more modes, the RFID tag comprising: a transceiver, configured to be able to perform RFID communications with the one or more gateways and one or more other assets; an accelerometer, configured to be able to determine and communicate acceleration of the RFID tag; a battery, configured to be able to provide power to the transceiver, the accelerometer and a microcontroller unit (MCU); and the MCU, configured to control operation of the RFID tag in one of a plurality of state-modes comprising a current state selected from one or more states and a current mode selected from one or more modes, each state-mode providing power to the transceiver, the accelerometer and the microcontroller differently, and operably connected to, and in communication with, the accelerometer and the transceiver, wherein the MCU is further configured to: check one or more state-change triggers and one or more mode-change triggers; toggle to a new state-mode upon detection of one or more state-change triggers or one or more mode-change triggers; and operate in the new state-mode.

The MCU may further be configured to toggle to the new state-mode if the new state-mode is a lower power consumption state-mode.

The state may be operational and reduces power consumption through reduced use of power-consuming elements when they are in power consuming operating modes and modes may reduce power consumption by putting power-consuming elements of RFID tag into low power operating modes.

The plurality of states may comprise: a stopped state where the RFID tag is not accelerating and the transceiver attempts, at a stopped state periodicity, to communicate stopped state information to the one or more gateways; a stationary state where the RFID tag has not been accelerating for a period of time, and the transceiver attempts, at a stationary state periodicity, to communicate stationary state information to the one or more gateways; an in-motion state where the RFID tag is accelerating and the transceiver attempts, at an in-motion state periodicity, to communicate in-motion state information to the one or more gateways.

The plurality of modes may comprise: an onsite mode where the RFID tag is onsite and the MCU puts the transceiver, the accelerometer and the MCU into a regular power operating mode; an offsite mode where the RFID tag is offsite and the MCU puts the transceiver, the accelerometer and the MCU into a low power operating mode.

The one or more state-change triggers may comprise an immobile trigger that indicates whether the RFID tag is stopped, an in-motion trigger that indicates whether the RFID tag is accelerating and a stationary trigger that indicates that RFID tag has been stopped for a period of time and wherein the one or more mode-change triggers comprise an onsite trigger that indicates that RFID tag is onsite and an offsite trigger that indicates that RFID tag is offsite.

The transceiver may further be configured to perform the check for the onsite trigger by attempting to communicate with one or more gateways at the site.

The accelerometer and MCU may further be configured to perform the checks for the in-motion trigger and the immobile trigger. The checks may be performed at a constant rate. The constant rate may differ for each state-change trigger and each mode-change trigger.

BRIEF DESCRIPTION OF THE DRAWINGS

Embodiments will now be described, by way of example only, with reference to the attached Figures, wherein.

DETAILED DESCRIPTION OF THE EMBODIMENTS

Figure 1:
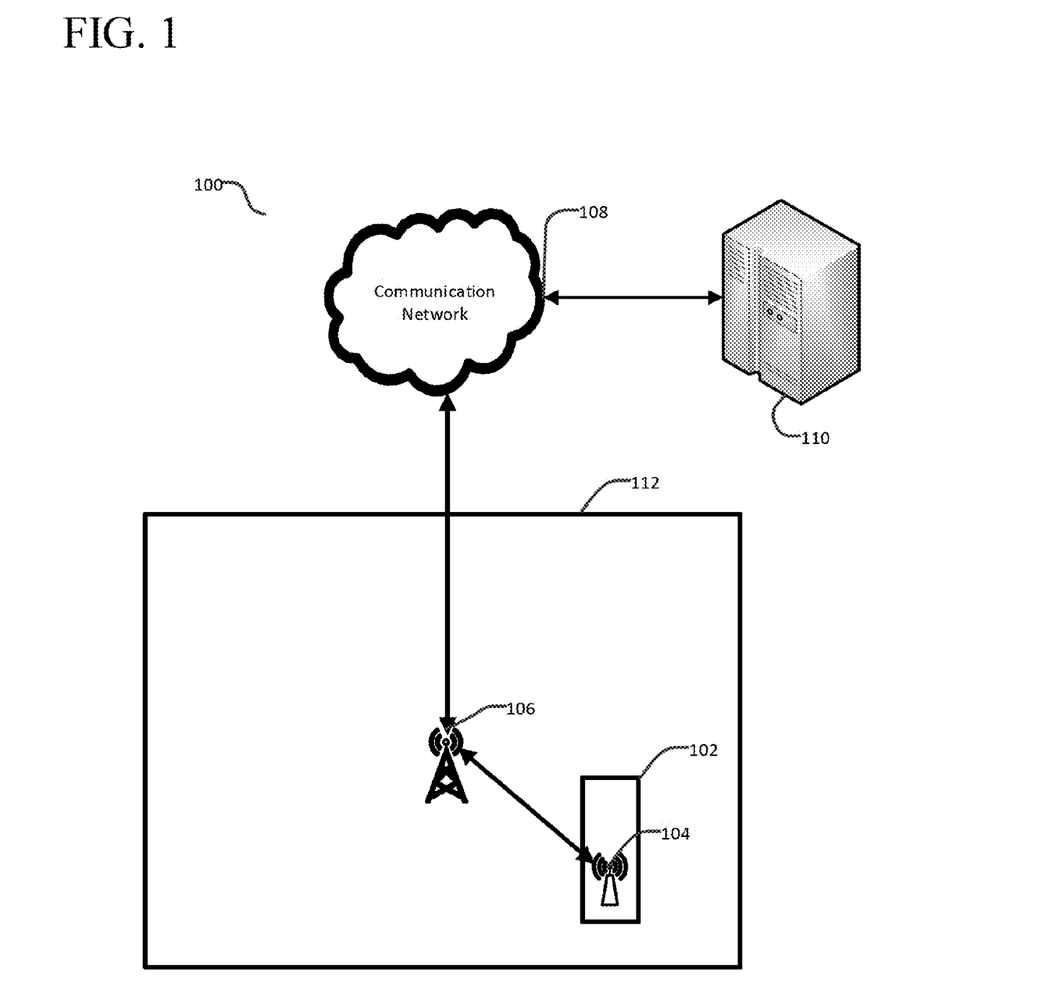
FIG. 1 shows a high-level architecture of a system for a tag based asset management in accordance with an embodiment of the invention.

FIG. 1 shows a high-level architecture of system 100 for a tag based asset management system comprising asset 102, further comprising tag 104, gateway 106, communication network 108 and central management system 110.

System 100 may allow one or more assets 102, tags 104 and gateways 106 to communicate with one another, for example to allow tracking of assets 102 and other related functionality of such systems. Such communication may be secured, such as encrypted, by one or more components of system 100 and may be communicated via one or more communication networks 108 or directly between components. System 100 may be used by fleet operators, transit agencies, and the like.

System 100 may allow communication between components thereof to accomplish the communication goals, while reducing power usage for one or more components thereof. Power usage may be reduced by i) characterizing assets 102 and/or tags 104 as being in one of a plurality of operational states (or simply 'states') based on factors such as the environment tag 104 is in (including temperature, pressure, moisture and the like; where other sensors may replace or augment accelerometer), or whether or not tag 104 is in motion, and attributing specific functions to that state (ie states being largely operational and providing opportunities to reduce power consumption through reduced use of power-consuming elements), and ii) putting assets 102 and/or tags 104 as being in one of a plurality of communication modes (or simply 'modes') that may put power-consuming elements or components of assets 102 and/or tags 104 to go into low power operating modes. In other words, a state is operational (how often are elements used, for how long, and for what operational purposes) and reduces power consumption through reduced use of power-consuming elements when they are in power consuming operating modes and modes reduce power consumption by putting power-consuming elements of RFID tag into low power operating modes (which may effect operational use of power consuming elements, but may not).

Figure 2:
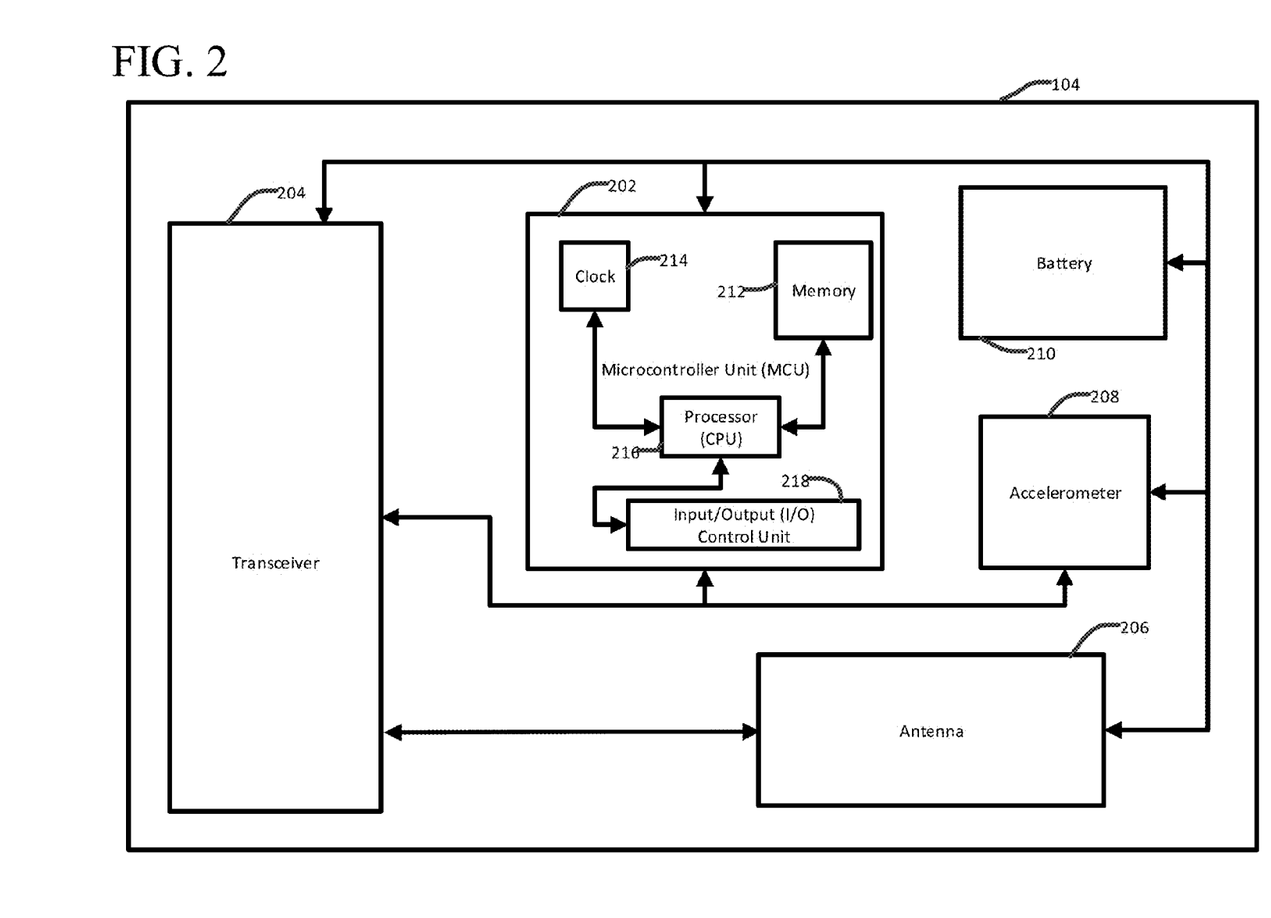
FIG. 2 shows a schematic of a tag according to an embodiment of the invention.

Various components can be put or operated in various stages of low power. The lowest may be to turn everything into "STANDBY". The MCU 202 or transceiver 204 for example may then have wake on radio (WOR) functionality which listens on a specific channel for noise (communication from other components, such as RFID from components of system 10). If it hears something, it wakes up the radio to the next level to check for a valid preamble of a packet header. If this passes (ie the packet header indicates a valid packet that needs to be processed), it has to then fully wake up, and possibly wake up other components of tag 104 and asset 102 to receive the signal and see if it is a message for this tag.

Some states may be defined such that tag 104 waits until reaching a specific state before performing power intensive operations, as characteristics of this state may make it more favourable for those operations.

Asset 102 may be any object that a user would like to track the location and/or the status of Asset 102 may be a vehicle that provides, or relates to the provision of, transit services that may or may not be moving. Asset 102 may comprise other components and systems (not shown) including, but not limited to, electrical, mechanical and computer systems. Asset 102 may be in one of a plurality of states based on factors which may comprise its location and/or whether or not it is in motion. These states may determine functions performed by components of asset 102, and may be used to reduce power consumption, at least partially through reduced operation/use.

Asset 102 further comprises tag 104, which may be located thereon or therein, and may be removably attached. Tag 104 may be able to retrieve and/or determine information relevant to asset 102, for example from other components of asset 102, and transmit that information to other assets or gateway 106. Tag 104 may further comprise sensors, or be operably connected to sensors (not shown), as described herein, that allow it to gather information regarding asset's 102 status. Tag 104 may be in one of a plurality of states based on factors which may comprise its location and whether it is in motion. As tag 104 may be a component of asset 102, these factors may be linked directly to the status of asset 102, and therefore asset 102 may be in a substantially similar state as tag 104. These states may directly affect the functionality of tag 104 and other components it is operably connected to.

Tag 104 may further be able to store information regarding the status of asset 102, and use that information to determine what state it should be in—where such states may determine or modify tag's 104 operations and/or its power consumption, as described herein. Tag 104 may also be able to reduce power consumption by not transmitting or receiving information for periods of time when communication may not be required. Tag 104 may provide protection from weather elements and handle a wide range of temperatures. Tag 104 may be powered by an onboard power source, as described herein.

Asset 102, tag 104 and elements of tag 104 (such as transceiver 204 or MCU 202) may operate in one or more communication/power modes, for example with each mode having different power consumption characteristics. In one embodiment, there may be two communication modes: onsite mode and offsite mode.

Onsite mode: When asset 102 is determined to be onsite, for example at a yard, tag 104 may operate in onsite mode. This may be a regular power consumption mode, as communication may be required when onsite.

Offsite mode: When asset 102 is determined to be offsite, tag 104 may operate in offsite mode. This may be a low power consumption mode, as communication may not be required when offsite (and hence lower power consumption modes for component power consumption modes may be selected).

Of course various communication/power modes may be defined, each mode specifying what component power mode to operate in, with various communication mode triggers determine how to transition between various communication modes.

Communication mode triggers may depend on the modes that are defined, and the aspects of system 100. In one embodiment, the onsite trigger (to go from offsite to onsite) can be one of several things: a specific onsite signal from another device (such as another asset 102, tag 104, gateway 106, and the like), any signal from a known system device (tag or gateway 106), or any signal specifically from a gateway 106 (or a signal occurring on the specific channel that an offsite tag is "listening" to). Selection of the desired triggers may help obviate the need for excessive exceptions and caveats to the triggers.

At any given time asset 102 and/or tag 104 may be in both a given state and a given mode, such that a current operating status (otherwise referred to as a 'state-mode') of tag 104 may comprise both a state and a mode. A power mode may "trump" a state; tag 104 may be in an "in-motion" state, as described herein, but goes into an offsite mode and hence does not process or communicate (which may, at least partly, because it is known that in offsite mode there is nothing to listen to the communication that may occur in "in-motion" and hence any power usage would be a waste).

In one embodiment signals from tags 104 and gateways 106 are on different channels so the source of the signal is easily identifiable without large amounts of processing (and hence power). Once tag 104 has entered offsite mode and is "asleep", tag 104 may only listens on the channel designated for gateways 106. It comes out of offsite mode when it receives any valid message from a gateway (not any specific message). It may sometimes be desirable to "stay onsite" when we hear signals from anything (tag or gateway or anything else), whereas other times it may be desirable to allow the device to go into "offsite" mode even if it hears signals from other tags—hence the need for configurable and detailed triggers (which may also reduce the need for programmatic exceptions to triggers).

Gateway 106 may receive transmissions from one or more tags 104 and provide those transmissions to central management system 110 via communication network 108. Gateway 106 may communicate with one of more tags 104 simultaneously. Gateway 106 may be powered, for example, externally, through a direct connection to the municipal electricity grid, or using an onboard power source. Gateway 106 may be removably attachable to substantially any surface and may operate in both external and internal environments. Gateways 106 may be located at substantially any location where assets 102 need to communicate. For example, gateway 106 may be placed within site 112 to collect information from, or generally communicate with, assets 102 within site 112. Gateway 106 may receive and transmit one or more frequencies or channels—for example its transmit frequency may be different from that of tags 104.

Communication network 108 enables communication of information between various components of system 100 including, but not limited to, gateway 106 and central management system 110. Communication network 108 allows for a plurality of signals to be sent through its network simultaneously. Communication network 108 may be any public or private network, wired or wireless, and may be substantially comprised of one or more networks that may be able to communicate with each other. Communication network 108 may use a variety of mediums, such as cellular and Wi-Fi networks. Communication networks 108 may not be required, for example, if components of system 100, such as gateway 106 and central management system 110 are able to communicate directly.

Central management system 110 may be a component of system 100 that may relate to a fleet of assets 102. Such functionality may include tracking the location of asset 102, diagnosing any issues with asset 102 that may require servicing and scheduling any service work that may be required for asset 102. Central management system 110 may compile information from one or more gateways 106 via communication network 108 with other information, such as servicing work schedules and parts delivery times, for use in providing functionality of system 100 and central management server 110. Central management system 110 may also perform analysis on this information to provide users with key metrics that may relate to the performance of asset 102 or the timeliness of maintenance operations, either in real-time or aggregated over configurable periods of time. Central management system 110 may be implemented via one or more pieces of software and may be operated by one or more users. Though shown as one computer, central management system 110 can be composed of one or more computing and data storage devices and its functionality can be split up across these devices as appropriate.

Site 112 may be a location that users of system 100 would like to use to track asset 102. Site 112 may be a location that is owned and/or operated by the users of system 100, and it may be useful to know when assets 102 enter or leave a site 112. For example, site 112 may be a location where assets 102 are stored or serviced, or may be a location where asset 102 is required to perform specific operations. Site 112 may be a bounded area, with only a limited number of entry/exit points (and each entry/exit point may have a gateway 106 located nearby for communicating entries and exits). In a transit application, for example, site 112 may be a transit bay where assets 102, such as transit vehicles, undergo maintenance and are storage when they are not being used.

FIG. 2 shows a schematic of tag 104 according to an embodiment of the invention. Tag 104 may be comprised of microcontroller unit (MCU) 202, transceiver 204, antenna 206 and accelerometer 208, any or all of which may be operably connected, for example to allow any required communication there between. Tag 104 further comprises battery 210, which may be operably connected to the other components in tag 104 for example to provide them a power source.

MCU 202 may control operation of tag 104, determining when tag 104 should perform specific operations, such as communication, and directing the operations of transceiver 204 and accelerometer 208. MCU 202 further comprises memory 212, clock 214, central processing unit (CPU) 216 and input/output ("I/O") control unit 218, and may comprise or house accelerometer 208 and/or transceiver 204 depending on hardware implementation details.

MCU 202 may cause tag 104 to toggle between one or more states of operation. Such toggling may depend on factors (which may be, or include, triggers) such as its environment, whether tag 104 is in motion, clock cycles (such as when clock cycles end states may be toggled or a determination may be made whether to toggle) and the like.

One or more states may be defined, each specifying operating characteristics for the operation of tag 104 for the state. This allows states to reflect the intended uses of tag 104 in its particular environment, and for the states to be set up to use the least amount of power required for the particular intended uses of the tag 104 in that state. As such, any number of states, with any number of state names may be defined. For example, "high power consumption", "medium power consumption", "low power consumption" and "no power consumption" states may be defined, or "high communication", "medium communication", "low communication" and "no communication" states may be defined (of course any number of gradations may be defined, with any other types of labels applied thereto). States may define operation of tag 104, for example what data is communicated, regularity of communication, RF frequency used, and the like. States may not, in contrast to communication/power modes, alter the underlying component power modes (such as "STANDBY" as discussed herein).

Operating characteristics may include:
 1) The type of communication that may occur (data being communicated, amount of data being communicated, frequency of data being communicated, receiver and receiver hardware, and the like). In certain states tag 104 may need to communicate to certain other components/entities (such as a gateway), at certain frequencies or based on certain triggers, different types/amounts of data, and the like. As noted above, in one embodiment a 'stationary state' may be defined as requiring no communication while a 'stopped state' requires continuous communication with any entities around it.

2) What components to power, and how/when. For example, transmitters and receivers and accelerometers may be powered on for different amounts of time, based on different clock cycles or timers (ie different periodicity for transceiver communications or communication attempts between the tag and one or more gateways that may be at the site), for different states. Continuing the example above, in such an 'offsite state' all components not requiring power may be powered down while in such a 'stopped state' all components may have power continuously so that communication can easily occur (without delays to power on or the extra power required to constantly power on and off).

In one embodiment that may be applicable to transit embodiments, the states may include:

'stationary' state, where asset 102 is immobile in a bay or at the site (and has been stopped for some time thus is not in the 'stopped' state) and communications, or attempts, of stationary state information, may occur between tag 104 and gateway 106 for short periods of time, followed by a long period of rest. This may be the state where asset tag 104 consumes a medium amount of power (a 'medium power consumption' state).

'in-motion' state, where tag 104 performs only operations that are required when asset 102 is in motion (such as communications, or attempts, of in-motion state information between tag 104 and gateway 106, at an in-motion state periodicity). This may be the state where tag 104 consumes low power;

'stopped' state, which may be a transition state where tag 104 may perform location checks and further motion checks to ensure that asset 102 is fully immobile before moving to a stationary state. In this state tag 104 may communicate stopped state information (or attempt to communicate) between tag 104 and gateway 106, at a stopped state periodicity, and may use more power than in the in-motion state and more power than the stationary state (and may be considered a high power consumption state).

Of course it is to be understood that in different embodiments or implementations the same states may have different operational characteristics and hence power consumption (for example an 'in-motion state' may use lots of power as communication is more important when offsite).

MCU 202 may have a configurable cycle (which may be timed by clock 214) where it provides power to components required to determine whether it may need to toggle tag 104 into another state. For example, MCU 202, at the end of a clock cycle, may query accelerometer 208 to determine whether tag 104 is in motion. If it is in motion, MCU 202 may transition tag 104 into an 'in-motion' state, and other components of tag 104 required for communication may be powered down as they are not required when tag 104 is in an 'in-motion' state—and tag 104 has therefore conserved significant battery life. Alternatively if MCU 202 is not in motion then MCU 202 may remain in a 'stationary state' and either continue performing communications or return components of tag 104 to a 'sleep' mode, depending on what operations were being performed before the accelerometer was queried. Of course it is to be understood that the reverse scenario is also possible (i.e. In-motion state requiring more power to perform operations).

MCU 202 may communicate directly with both accelerometer 208 and transceiver 206, sending these components operation instructions and responding to the information it receives from them. For example, when in a stationary state, MCU 202 may provide or direct power to accelerometer 208 and then query accelerometer 208 to determine if asset 102 is in motion and optionally provide or direct power to transceiver 204 to enable transceiver 206 to determine if asset 102 is at site 112. MCU 202 may also communicate with systems outside of tag 104, for example other computer systems on asset 102 (such as via I/O control unit 216,) and use that information to determine what operations tag 104 should perform.

Transceiver 204 allows tag 104 to communicate with system 100, and may use Radio Frequency Identification (RFID) technology to do so. Transceiver 204 may communicate substantially any of the information tag 104 has, collects or calculates, including, for example the location of asset 102. Transceiver 204 may generate and receive signals wirelessly. Transceiver 204 may be able to convert signals that it receives wirelessly into data that may be transmitted to and interpreted by MCU 202. Transceiver 204 may also receive information from MCU 202 that may control what signals transceiver 204 transmits, when it will transmit signals, and when it will listen for signals to receive. Transceiver 204 may be a low power transceiver, such as the CC1101 produced by Texas Instruments, and may be able to enter different modes to minimize power usage. For example, when not in operation, transceiver 204 may enter a 'sleep' mode where it may use very little power and may not perform any communications. Tag 104 may use this 'sleep' mode more frequently when in a state that requires little communication, for example 'in-motion' state. Transceiver 204 may also provide a low power method for tag 104 to determine if it in on site 112, by listening for signals transmitted by gateway 106 without using more power to interpret the content of the signals.

Though transceiver 204 may be able to transmit and receive signals itself, it may be operably connected to antenna 206, which may enhance performance of one or both of these functions instead. Antenna 206 may be able to increase the ranges across which tag 104 can transmit and/or receive messages, and do so without consuming as much power as transceiver 204 may have consumed separately to achieve the same range. Transceiver 204 may use power from battery 210 to operate antenna 206. Antenna 206 may also be able to minimize power consumption by entering a 'sleep' mode, similar to the sleep mode that transceiver 204 may enter—if, for example an active antenna (having some form of controller separate from transceiver) was used.

Accelerometer 208 may detect and measure changes in motion, for example an acceleration measurement (such as in m/s/s) and communicate with MCU 202. It may remain in a 'sleep' mode, consuming very little to no power, until it is awakened by MCU 202, which may send a signal to tell accelerometer 208 to power on using battery 210, or power it on directly. MCU 202 may further direct accelerometer 208 to perform a motion detection reading, the results of which it can then pass along to MCU 202. Accelerometer 208 may require very little power to operate, and may return to sleep after the operation is complete, powering itself down until MCU 202 awakens it again. Acceleration measurements may be stored in memory 212, for example to use in 'motion detection' as described herein. For example, the two most recent acceleration readings may be stored, along with time stamps so that comparing acceleration readings can include how far apart the readings were taken (for example to help verify that differences actually indicate motion and a further reading is not required).

Of course it is to be understood that various approaches to confirming motion are possible and within the scope of the present invention. For example, polling an accelerometer is discussed herein but a gyro could also be used. Additionally, a device that is interrupt driven could also be used (it would wake up the MCU to identify a change in condition), for example a switch or push button.

Battery 210 may store power for use by some or all of the components located on tag 104. It may power these components directly, or may be routed through MCU 202 to the other components, with MCU 202 directing when accelerometer 208 and transceiver 204 receive power. Similarly, battery 210 may power antenna 206 directly or through transceiver 204. It may be a light, small battery whose usage would have to be minimized to last for long periods of times. It may be charged by an external source. Exemplary batteries 210 may include lithium, ion or lithium-ion batteries and the like.

Memory 212 may allow information to be stored in tag 104. It may store or collect information from within MCU 202, or be sent information from other sources and store that information for later use by tag 104. This information can comprise programmed instructions as well as information collected by other components, and that may be used by other components, such as CPU 214. Memory 212 may store information regarding the current status of tag 104, such as what state it is in and whether or not it is onsite. Memory 212 may comprise volatile memory such as random access memory, non-volatile memory such as varieties of read only memory, or a combination of both.

Clock 214 may track time and provide a stable clock signal which may be used by CPU 216, and/or other components of tag 104, to perform operations, as known by those of skill in the art. The clock also may be directly connected to other components within tag 104. This clock may be based on a crystal oscillator, or use another technology as would be known to those of skill in the art. Clock 214 may have one or more configurable timers, one of which may be a trigger for tag 104 to wake up when it expires.

CPU 216 may control at least some of the operations of tag 104 by performing logical calculations using information it receives from the other components and instructions, such as executable instructions akin to software programs that may be stored in memory 212. CPU 216 may also use this information to determine what state tag 104 should be in, and may cause such state to be stored in memory 212, possibly along with other information, such as the last acceleration reading from accelerometer 204. CPU 216 may determine what information should be stored in memory 212, and if information should be sent to components outside of MCU 202 using I/O control unit 216 and/or transceiver 206. CPU 214 may also determine what operations other components, inside and outside of MCU 202, should be performing, and if they should be in, or transition to, another mode, such as 'sleep' mode to lower power consumption.

I/O control unit 218 may send information to components outside of MCU 202, and receive information from outside components to be processed by MCU 202, which may include transceiver 204 and accelerometer 208. These outside components may be internal or external to tag 104. If the outside components are external to tag 104, the information may be sent wirelessly to the outside components from I/O control unit 218 via transceiver 204. CPU 216 may communicate with I/O control unit 218, for example to direct I/O control unit 218 what information should be sent and received. CPU 216 can use this information as an input into its logical calculations.

Figure 3:
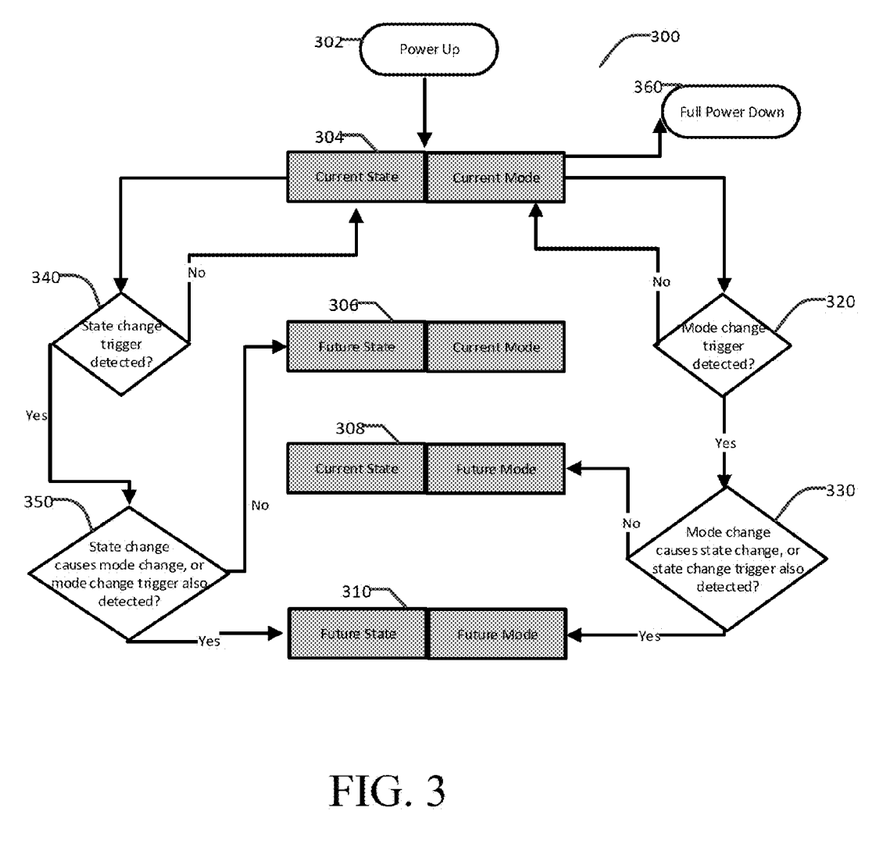
FIG. 3 is a flow chart of a method for operation of a tag to limit power consumption based on the state and power mode of the asset according to an embodiment of the invention.

FIG. 3 is a flow chart of method 300 for operation of tag 104 to limit power consumption based on the state and power mode of asset 102. Method 300 may use a combination of states, power modes, and triggers to limit power consumed by tag 104. The states may be configured in such a way as to only perform functions that may be required in that particular state, thereby allowing tag 104 to power down components not involved in those functions.

Tag 104 may toggle between states as the result of certain triggers checks (both power mode triggers and state triggers) periodically performed by tag 104. Method 300 includes three different state trigger checks (though many others are possible depending on the required operation and states): a check to determine if tag 104 is in motion, and a check to confirm that tag 104 is immobile, or has completely stopped moving for a period of time. These three trigger checks are described in greater detail herein, though it is to be understood that other trigger checks may be used. Though different states may use similar trigger checks, the frequency at which a trigger check is performed may differ from one state to another. The configured timings for the trigger checks for each state may be stored in memory 212 and controlled by clock 214. Power mode trigger in method 300 is solely 'on-site' trigger, though others may be used in addition or instead of such trigger.

Method 300 is described generally for example without specifying particular states for the "current state", "current mode", "future state" and "future mode". Method 300 may be used with FIG. 4 (as described herein) for particular embodiments thereof.

Method 300 begins at 302 where tag 104 is powered on. Prior to 302, tag 104 may have been using very little power, and possibly even none at all. At 302, battery 210 may supply power to MCU 202.

At 304, MCU 202 may transition into a particular 'current state', such as a stationary state, though in another embodiment of the invention MCU 202 may transition from power up to a different state. While in stationary state, tag 104 may be in communication with gateway 106, transmitting data regarding the status of asset 102, which may include its location and maintenance requirements. Stationary state may be the most power intensive state, as the majority of communications between tag 104 and gateway 106 may be reserved for when asset 102 is immobile. This may be done to ensure that there is a reliable communication link between tag 104 and gateway 106, and that they do not move out of range of each other while communicating. In stationary state, tag 104 may also be communicating with other tags 104 in the area. To conserve power, tag 104 may only communicate this information as necessary, for example if the status of asset 102 changes. Once these communications are complete, MCU 202 may instruct transceiver 204 (and antenna 206 if antenna 206 is an active antenna) to enter 'sleep' modes, further conserving power. In stationary state, tag 104 may also perform trigger checks at a reduced frequency, as the status of asset 102 may be less likely to change when it is immobile.

Method 300 then proceeds to one or more of 320 and 340. Method 300 may occur in parallel or in serial but is shown in parallel. In essence, when in parallel, state triggers are monitored (as such triggers are configured to be monitored)

and mode triggers are monitored (as such triggers are separately configured to be monitored). Thus an operating status (as shown in each of 304/306/308/310) comprises both a state and a mode.

Following method 300 to 340, state change triggers may be detected or checked that may impact a current state (such as in-motion). If the current state is not impacted by a particular state change trigger it may not be checked. If a relevant/applicable state change trigger is not noted at 340 then method 300 continues to 304 where the state-mode has not changed. If, instead, a state change trigger is detected then method 300 may (though it need not depending, for example, on parallel or serial processing) proceed to 350 to determine whether the state change, or another mode change trigger, may simultaneously cause a mode change. If not then only a future state is achieved, as shown at 306. Otherwise at 310 there is both a future state and future mode.

Following method 300 to 320, mode change triggers may be detected or checked that may impact a current state (such as on-site). If the current mode is not impacted by a particular mode change trigger it may not be checked. If a relevant/applicable mode change trigger is not noted at 320 then method 300 continues to 304 where the operating status has not changed. If, instead, a mode change trigger is detected then method 300 may (though it need not depending, for example, on parallel or serial processing) proceed to 330 to determine whether the mode change, or another state change trigger, may simultaneously cause a state change. If not then only a future mode is achieved, as shown at 308. Otherwise at 310 there is both a future state and future mode.

Method 300 may substantially continue until a full power down at 360 (such as asset 102 being decommissioned or otherwise turned off).

Figure 4:
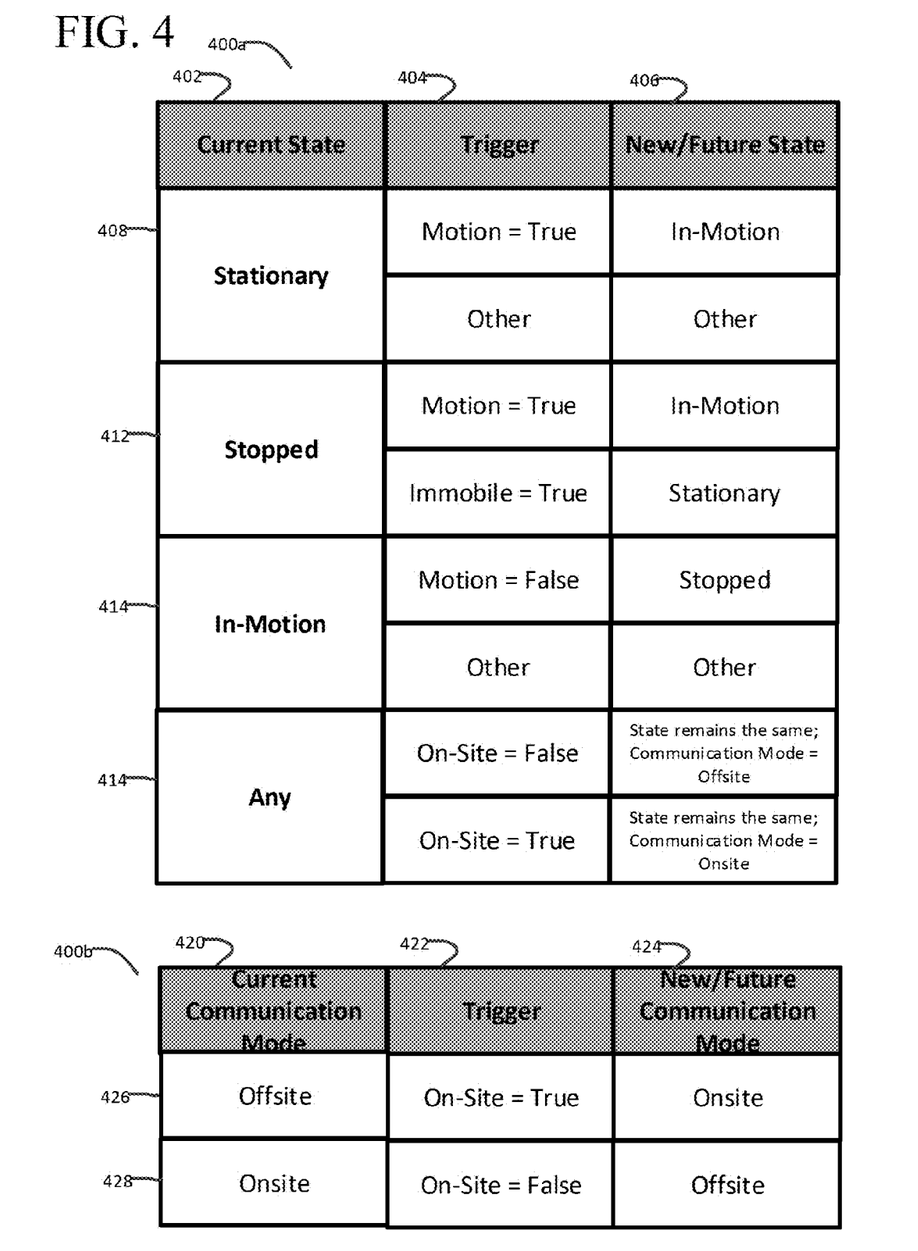
FIG. 4 shows tables that describe transitions between states and power modes according to an embodiment of the invention.

FIG. 4 shows tables 400*a* and 400*b* that describe transitions between states and power modes. As described herein, trigger checks (state or mode) can be performed by tag 104 at periodic intervals to determine if a state or mode transition is required, and the results of these trigger checks may be stored in memory 212 of tag 104. Based on the changes in these values, MCU 202 may toggle tag 104 into a new state or mode from the current state. Table 400*a* shows which triggers may cause tag 104 to transition to a new state, based on the current state of tag 104. This entire table may be stored in memory 212 so that it may be used by MCU 202 to determine which state it should transition into based on the current state and the trigger values.

Table 400*b* shows which triggers may cause tag 104 to transition to a new mode, based on the current mode of tag 104. This entire table may be stored in memory 212 so that it may be used by MCU 202 to determine which mode it should transition into based on the current state and the trigger values.

Turning to table 400*a*, current state column 402 shows the possible current states of tag 104 (stationary, stopped and in-motion) as well as the trigger values that are expected when tag 104 is in that state. Trigger column 404 shows the triggers that could apply to tag 104 when it is in the state listed in current state column 402, and resultant state column 406 shows what new state tag 104 will be if it receives trigger shown in trigger column 404 while in current state shown in current state column 402. A few examples of transitioning or toggling are provided herein.

The first state examined in table 400*a* is the stationary state at 408. When in stationary state, the trigger values stored in memory 212 on tag 104 may be motion =false. If tag 104 is in stationary state, it may be triggered to transition to a new state if motion becomes true (tag 104 is in motion).

If tag 104 is in stationary state and motion becomes true, tag 104 transitions into in-motion state. Of course there may be other triggers and states to transition to (from any of the states described herein).

The next state examined in table 400*a* is the stopped state at 412. As described herein, stopped state is a transition state, therefore tag 104 may only remain in stopped state long enough to perform one trigger check. In stopped state, tag 104 begins performing a confirmation check to determine if it is immobile. If during this confirmation check motion becomes true, tag 104 transitions from stopped state to in-motion state. Otherwise, if tag 104 confirms that tag 104 is immobile, tag 104 transitions to stationary state. As described herein, stopped state may be a transition state and therefore tag 104 may not stay in this state for a period of time longer than is required to perform the confirmation check.

The final state examined in table 400*a* is the in-motion state at 414. If tag 104 is in in-motion state, it may be triggered to transition if motion becomes false. If tag 104 is in in-motion state and motion becomes false, tag 104 transitions into stopped state.

As shown in row 414, any current state is also impacted by mode triggers (noting that On-site may typically be a mode trigger and not a state trigger), in that modes may change regardless of what state tag 104 is in.

Turning to table 400*b*, current mode column 420 shows the possible current modes of tag 104 (offsite and onsite) as well as the triggers and values that are expected when tag 104 is in that mode. Trigger column 422 shows the triggers that could apply to tag 104 when it is in the mode listed in current mode column 420, and resultant mode column 424 shows what new mode tag 104 will be if it receives trigger shown in trigger column 422 while in current mode shown in current mode column 420.

As described herein, different triggers (state and mode), modes and states are all possible.

Figure 5:
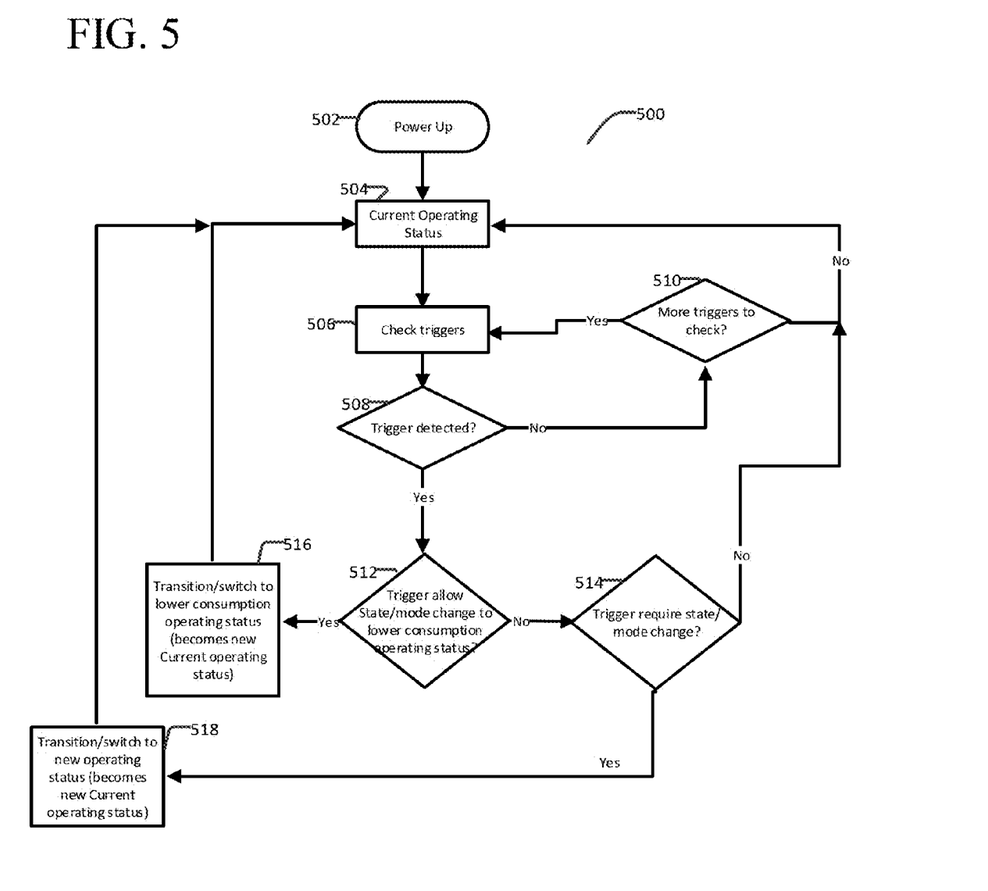
FIG. 5 is a flow chart of a further method for operation of a tag to limit power consumption based on the state of the asset according to an embodiment of the invention.

FIG. 5 is a flow chart of a further method 500 for operation of a tag to limit power consumption based on the state and power mode of the asset. Method 500 may be performed on tag 104, for example by MCU 202.

Method 500 begins at 502 where tag 104 (and or asset 102) is powered up. Method 500 may then continue until tag 104 (and or asset 102) is powered down or otherwise loses power or ceases operation.

At 504 tag 104 is operating in a current operating status, as described herein.

At 506 a state change trigger or power mode trigger is checked. These may be one of accelerometer values from accelerometer 204 (indicating motion of asset 102), whether asset 102 is determined to be stopped or stationary, in a bay or offsite, and the like, as described herein.

If a trigger is not detected at 506 then method 500 continues at 510 to check other triggers, if applicable. If all triggers have been checked (at least for this check, noting periodic polling or checking may occur) then method 500 continues back at 504 where operation in a current state-mode occurs. If a trigger is detected at 506 then method 500 continues at 512 to determine whether the trigger allows or requires a state or mode change, for example to a lower power consumption state. This may be a goal of method 500—to operate as much as possible in the lowest power consumption operating status for the particular implementation and available states and modes.

At 512 if such a lower power consumption operating status is allowed then at 516 the new operating status is entered into and become the "current operating status" for method 500 to return to 504. It is worth noting that until power is turned off or some other 'final' event occurs method 500 may proceed.

If the trigger does not allow a lower power consumption operating status to be entered at 512 then at 514 a query is made whether the trigger requires an operating status change. If it does then at 518 the operating status change occurs and the new operating status is entered into and become the "current operating status" for method 500 to return to 504. Returning to 514 if no operating status change is required then method 500 continues to 504. Operation at 514 may vary; state and mode changes may take power so unnecessary changes may be avoided. Alternatively it may be desirable to switch states and modes so that proper operation is ensured. Ultimately some of the particular operation will depend on the implementation, provided that the general concept of moving to a lower power consumption operating status (in particular based on one or more triggers that may be established and observed) may be followed.

In one embodiment, asset 102 may be a transit vehicle and site 112 may be a transit bay. While in the transit bay, the transit vehicle (asset 102) may transmit its location, or presence at the bay, via tag 104 to gateway 106 so that central management system 110 may track it and perform any required operations, for example send out a maintenance crew to the vehicle. While parked, tag 104 on the transit vehicle can conserve power by entering a stationary state and onsite mode and reducing, if not turning off, its communications components, only powering on components as required to check triggers. While away from the transit bay, tag 104 on the transit vehicle may enter an offsite mode to conserve power while it cannot communicate with gateway 106.

In another embodiment, asset 102 may be a taxi, and site 112 may be a location where taxis frequently stop for long periods of time while waiting for passengers (a hotel or an airport, for example). While away from the location, tag 104 on the taxi may receive information about its trips (distance travelled, fees collected etc.) from other components on the taxi and store them on memory 212. When the taxi returns to the location, the onsite trigger becomes true and allows tag 104 to begin transmitting the collected data to gateway 106 so that it can be analyzed by central management system 110. Once the taxi is parked in the location, tag 104 may enter stationary state to reduce communications and conserve power.

In another embodiment, asset 102 may be a grocery cart and site 112 may be a grocery store lot. While parked at the grocery store, tag 104 on the grocery cart may conserve power by reducing communications. When in use by a customer and therefore in motion, tag 104 may enter an in-motion state and record as well as transmit its location to central management system 110 via gateway 106. This information may be used by central management system 110, for example, to determine which parts of the grocery store customers are spending the most time in. When the grocery cart leaves the bounds of the grocery store lot, tag 104 may respond to the onsite trigger becoming false by engaging a locking mechanism on the wheels, to ensure the grocery cart does not get too far from the grocery store.

What is claimed is:

1. A radio frequency identification (RFID) tag on an asset within an asset management system, the asset management system comprising one or more assets, one or more gateways and one or more other assets at a site that tags can communicate with, and assets in the asset management system either being on-site or off-site, the RFID tag operable in one of several state-modes, each state-mode having a different power consumption level and comprising one state of one or more states and one mode of one or more modes, the RFID tag comprising:
   a transceiver, configured to perform RFID communications with the one or more gateways and one or more other assets;
   an accelerometer, configured to determine and communicate acceleration of the RFID tag;
   a battery, configured to provide power to the transceiver, the accelerometer and a microcontroller unit (MCU); and
   the MCU, configured to control operation of the RFID tag in one of a plurality of state-modes comprising a current state selected from one or more states and a current mode selected from one or more modes, each state-mode providing power to the transceiver, the accelerometer and the microcontroller differently, and operably connected to, and in communication with, the accelerometer and the transceiver, wherein the MCU is further configured to:
   check one or more state-change triggers and one or more mode-change triggers;
   toggle to a new state-mode upon detection of one or more state-change triggers or one or more mode-change triggers; and
   operate in the new state-mode.

2. The system of claim 1 wherein the MCU is further configured to toggle to the new state-mode if the new state-mode is a lower power consumption state-mode.

3. The system of claim 2 wherein a state is operational and reduces power consumption through reduced use of power-consuming elements when they are in power consuming operating modes and modes reduce power consumption by putting power-consuming elements of RFID tag into low power operating modes.

4. A radio frequency identification (RFID) tag on an asset within an asset management system, the asset management system comprising one or more assets, one or more gateways and one or more other assets at a site that tags can communicate with, and assets in the asset management system either being on-site or off-site, the RFID tag operable in one of several state-modes, each state-mode having a different power consumption level and comprising one state of one or more states and one mode of one or more modes, the RFID tag comprising:
   a transceiver, configured to perform RFID communications with the one or more gateways and one or more other assets;
   an accelerometer, configured to determine and communicate acceleration of the RFID tag;
   a battery, configured to provide power to the transceiver, the accelerometer and a microcontroller unit (MCU); and
   the MCU, configured to control operation of the RFID tag in one of a plurality of state-modes comprising a current state selected from one or more states and a current mode selected from one or more modes, wherein a state is operational and reduces power consumption through reduced use of power-consuming elements when they are in power consuming operating modes, and the plurality of states comprise i) a stopped state where the RFID tag is not accelerating and the transceiver attempts, at a stopped state periodicity, to communicate stopped state information to the one or more gateways, ii) a stationary state where the RFID tag has not been accelerating for a period of time, and the transceiver attempts, at a stationary state periodicity, to communicate stationary state information to the one or more gateways and iii) an in-motion state where the RFID tag is accelerating and the transceiver attempts, at an in-motion state periodicity, to communicate in-motion state information to the one or more gateways, and modes reduce power consumption by putting power-consuming elements of RFID tag into low power operating modes, each state-mode providing power to the transceiver, the accelerometer and the microcontroller differently, and operably connected to, and in communication with, the accelerometer and the transceiver, wherein the MCU is further configured to:

- check one or more state-change triggers and one or more mode-change triggers;
- toggle to a new state-mode upon detection of one or more state-change triggers or one or more mode-change triggers, or if the new state-mode is a lower power consumption state-mode; and
- operate in the new state-mode.

5. The system of claim 4, wherein the plurality of modes comprise:

an onsite mode where the RFID tag is onsite and the MCU puts the transceiver, the accelerometer and the MCU into a regular power operating mode;

an offsite mode where the RFID tag is offsite and the MCU puts the transceiver, the accelerometer and the MCU into a low power operating mode.

6. The system of claim 5, wherein the one or more state-change triggers comprise an immobile trigger that indicates whether the RFID tag is stopped, an in-motion trigger that indicates whether the RFID tag is accelerating and a stationary trigger that indicates that RFID tag has been stopped for a period of time and wherein the one or more mode-change triggers comprise an onsite trigger that indicates that RFID tag is onsite and an offsite trigger that indicates that RFID tag is offsite.

7. The system of claim 6, wherein the transceiver is further configured to perform a check for the onsite trigger by attempting to communicate with one or more gateways at the site.

8. The system of claim 7, wherein the accelerometer and MCU are further configured to perform the checks for the in-motion trigger and the immobile trigger.

9. The system of claim 8, wherein the checks are performed at a constant rate.

10. The system of claim 9, wherein the constant rate may differ for each state-change trigger and each mode-change trigger.

* * * * *